Nov. 29, 1927.
W. F. FOLMER
1,650,702
WIND PROPELLED DEVICE
Filed Jan. 30, 1926
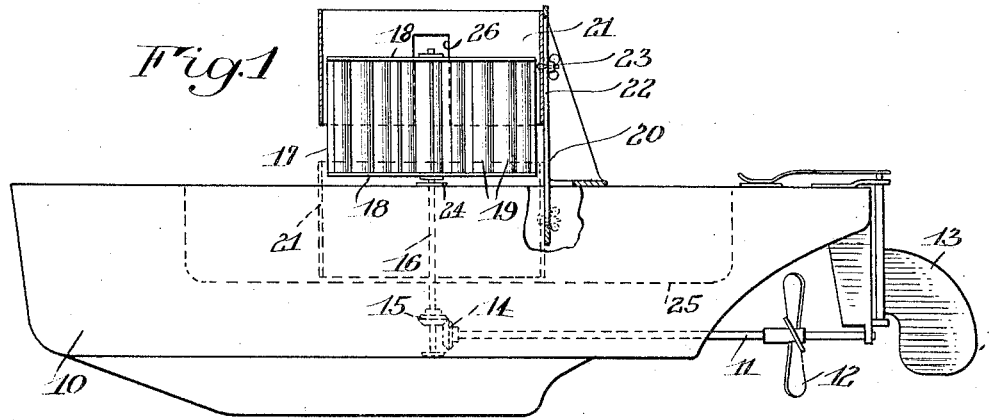
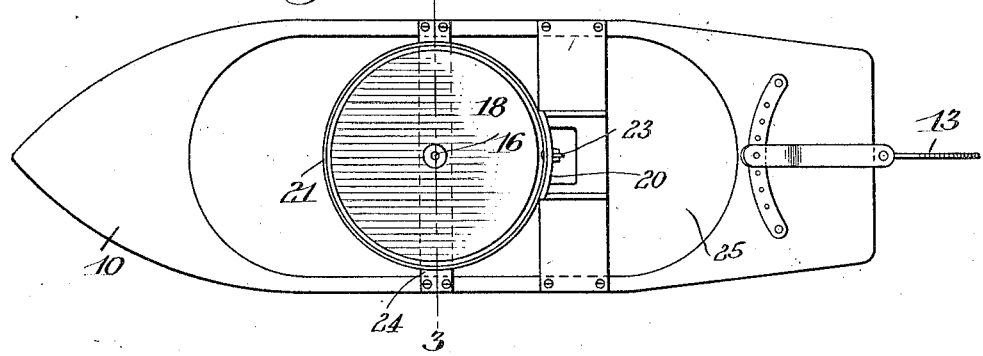
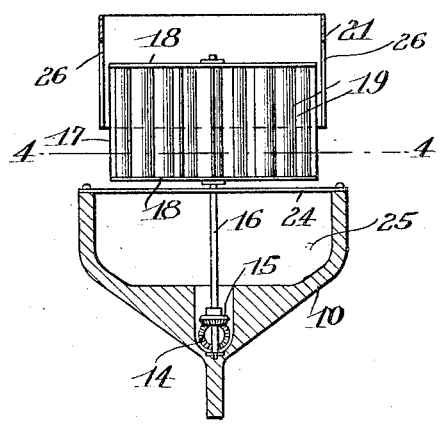
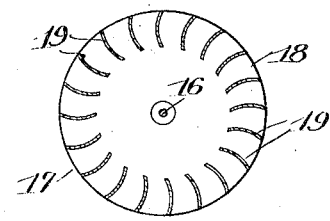
INVENTOR
William F. Folmer
BY
Crumpton & Griffith
his ATTORNEYS Patented Nov. 29, 1927.

1,650,702

UNITED STATES PATENT OFFICE.

WILLIAM F. FOLMER, OF ROCHESTER, NEW YORK.

WIND-PROPELLED DEVICE.

Application filed January 30, 1926. Serial No. 85,006.

This invention relates to wind propelled devices, and has for an object to provide an improved device of this type which may be operated with equal force and efficiency by wind coming from any direction; with which the driving influence of the wind may be varied in order to vary the speed of propulsion of the device; and which will be relatively simple, efficient, easily applied to hull designs when employed for the propulsion of boats, and inexpensive.

Various other objects and advantages will be apparent from the following description of an embodiment of the invention, and the novel features will be particularly pointed out hereinafter in connection with the appended claims.

In the accompanying drawing,

Figure 1 is a side elevation of a wind propelled boat constructed in accordance with the invention, and with certain portions in section in order to show parts otherwise concealed thereby;

Figure 2 is a plan of the same;

Figure 3 is a transverse sectional elevation of the same, with the section taken approximately along the line 3—3 of Figure 2; and Figure 4 is a sectional plan through the wind wheel with the section taken approximately along the line 4—4 of Figure 3.

In the illustrated embodiment of the invention the boat hull 10 may be of any suitable design or construction, and provided with a propeller shaft 11 carrying a propeller wheel 12. The hull may also have the usual rudder 13 controlled in any suitable manner as usual in boat constructions.

The shaft 11 is provided, at a point within the hull, with a bevel gear 14, which meshes with and drives a bevel gear 15 that is carried by and drives a shaft 16, the latter extending approximately vertically of the hull and into an exposed position on the hull, such as above the deck thereof, as shown in Figures 1 and 3. A suitable wind wheel 17 is mounted upon the shaft 16 in exposed position on the hull, where it will be struck by wind coming from as many directions as possible.

This wheel may be of any suitable construction, preferably is provided with spaced flanges or disks 18, which are mounted upon the shaft 16 and connected by a plurality of vanes 19, with the vanes extending approximately vertically. The vanes may be segments of a cylinder or concavo-convex strips, arranged in a row about the axis of the shaft 16 with all of the convex faces similarly positioned.

When such a wheel is struck by wind coming from any direction it will be rotated, and in rotating will operate the shaft 16, and through it and the bevelled gears 14 and 15 will drive the propeller shaft 11. It will be understood, of course, that suitable reverse gear mechanism (not shown) may be provided, if desired, between the propeller shaft and the wind wheel, so that the propeller shaft may be reversed whenever occasion requires it.

A suitable support, such as a bracket 20, may be provided upon the hull adjacent the wind wheel, and a shield 21 is supported thereon exteriorly of the wheel in such a manner as to be adjustable into positions in which it protects the wheel to various extents from the driving action of a wind. For example, the shield may, and preferably does, comprise a tubular object such as a sleeve or cylindrical shell, which is connected to the support or bracket 20 so as to be adjustable vertically or lowered over the wheel to various extents, even into the hull at times.

In a simple case, the bracket or support 20 may have a vertically extending slot 22, and the shield 21 may have a supporting, clamping and guiding element 23 projecting therefrom and running in the slot. When such a shield is lowered over the wind wheel to various extents, it will variably protect the wheel from the driving action of wind from any direction, and therefore the speed of the boat may be varied by shifting the shield 21 vertically over the wheel to various extents.

In some instances, such as in connection with boats, it is desirable to lessen the wind resistance as far as possible, and therefore the shield may be lowered into the hull when the maximum driving action of the wind is desired. In a simple example, where the shaft 16 is supported adjacent the wind wheel by a cross bar 24 which extends across the well 25 into which the shield is to be dropped, the shield may be provided with slots 26 extending upwardly from its lower edge in order to clear this cross bar during descent of the shield into the well 25. The dropped position of the shield is shown by dash lines in Figure 1.

It will be obvious that various changes in the details of the simple embodiment of the invention, which has been herein described and illustrated in order to explain the nature of the invention, may be made by those skilled in the art in order to meet various commercial conditions, within the principle and scope of the invention as expressed in the appended claims.

What I claim is:—

1. A wind propelled boat comprising a hull having a propeller, a wind wheel mounted in an exposed position upon the hull, a driving connection between the wheel and propeller, an encompassing shield for said wheel, and means for mounting said shield so as to be movable through various extents into positions in which it shields various portions of the wheel from wind and thereby causes a decrease in the turning torque given the wheel by the wind comprising a slotted bracket secured to the hull at one side of the wheel and a supporting, guiding, and clamping element on the shield co-operating with the slot in the bracket.

2. A wind propelled boat comprising a hull, a wind wheel mounted in an exposed position upon the hull and rotatable about an approximately vertical axis, whereby it may be operated by wind coming from any direction, means operated by the wheel for propelling the hull, and a shield adjustable in front of variable sections of the wheel to shield the latter from the driving winds to various extents and thereby govern the speed of its rotation, said shield being also movable to a position in which it is itself completely shielded by the hull.

WILLIAM F. FOLMER.